United States Patent
Weiss et al.

(10) Patent No.: US 12,151,679 B2
(45) Date of Patent: Nov. 26, 2024

(54) METHOD AND APPARATUS FOR CONTROLLING A SAFETY DEVICE OF A VEHICLE, AND SAFETY SYSTEM FOR A VEHICLE

(71) Applicant: Robert Bosch GmbH, Stuttgart (DE)

(72) Inventors: Christian Weiss, Leonberg (DE); Gyorgy Csaba, Budapest (HU); Heiko Kim, Bietigheim-Bissingen (DE); Joram Berger, Heimsheim (DE); Nina Braunert, Leonberg-Warmbronn (DE); Heiko Freienstein, Weil der Stadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 289 days.

(21) Appl. No.: 17/453,526

(22) Filed: Nov. 4, 2021

(65) Prior Publication Data

US 2022/0144264 A1 May 12, 2022

(30) Foreign Application Priority Data

Nov. 9, 2020 (DE) .................... 10 2020 214 029.4

(51) Int. Cl.
*B60W 30/095* (2012.01)
*B60W 30/09* (2012.01)
*B60N 2/00* (2006.01)

(52) U.S. Cl.
CPC ......... *B60W 30/0956* (2013.01); *B60N 2/002* (2013.01); *B60W 2520/10* (2013.01);
(Continued)

(58) Field of Classification Search
CPC . B60N 2/002; B60R 21/0134; B60R 21/0136; B60T 2201/022; B60T 2210/32;
(Continued)

(56) References Cited

U.S. PATENT DOCUMENTS

| | | | |
|---|---|---|---|
| 2009/0072996 A1* | 3/2009 | Schoepp ................ | B60Q 9/007 701/47 |
| 2015/0120086 A1* | 4/2015 | Endo ..................... | B60W 50/12 701/1 |
| 2015/0166058 A1* | 6/2015 | Mizutani ................ | B60K 35/00 701/1 |
| 2017/0072949 A1* | 3/2017 | Vollmer ................ | B60W 10/20 |

(Continued)

FOREIGN PATENT DOCUMENTS

| | | |
|---|---|---|
| DE | 102004056120 A1 | 5/2006 |
| DE | 102008010667 A1 | 8/2008 |

(Continued)

*Primary Examiner* — Peter D Nolan
*Assistant Examiner* — Ce Li Li
(74) *Attorney, Agent, or Firm* — NORTON ROSE FULBRIGHT US LLP; Gerard A. Messina

(57) ABSTRACT

A method for controlling a safety device of a vehicle. The safety device reacts to an imminent collision by an intervention in a longitudinal and/or lateral guidance of the vehicle. The method includes reading in environment data and trip data regarding the collision object in an environment of the vehicle and the vehicle, and seat occupancy data regarding an occupancy state of at least one seat of the vehicle; ascertaining: an expected impingement side of the collision object on the vehicle; a velocity change of the vehicle in the context of the collision; and a seat occupancy distribution in the vehicle, using the seat occupancy data; executing an evaluation of the velocity change with regard to a threshold value and/or of the seat occupancy distribution relative to the expected impingement side; generating, depending on a result of the evaluation, a control signal for the safety device.

11 Claims, 2 Drawing Sheets

(52) U.S. Cl.
CPC ... *B60W 2520/105* (2013.01); *B60W 2520/12* (2013.01); *B60W 2520/125* (2013.01); *B60W 2540/227* (2020.02); *B60W 2554/4041* (2020.02); *B60W 2554/4042* (2020.02); *B60W 2554/4043* (2020.02); *B60W 2710/18* (2013.01)

(58) Field of Classification Search
CPC .... B60T 2270/402; B60T 7/22; B60W 10/20; B60W 2040/0881; B60W 2400/00; B60W 2540/227; B60W 2554/00; B60W 2556/00; B60W 2710/18; B60W 2710/20; B60W 2900/00; B60W 30/085; B60W 30/09; B60W 30/0953; B60W 30/0956; B60W 40/08; B60W 40/107; B60W 40/109; B60W 50/0097
See application file for complete search history.

(56) References Cited

U.S. PATENT DOCUMENTS

| | | | | |
|---|---|---|---|---|
| 2019/0023277 | A1* | 1/2019 | Roger | B60W 50/0098 |
| 2022/0144253 | A1* | 5/2022 | Weiss | B60W 30/09 |
| 2022/0144254 | A1* | 5/2022 | Weiss | B60W 30/0953 |
| 2022/0144262 | A1* | 5/2022 | Weiss | B60W 30/095 |
| 2022/0144263 | A1* | 5/2022 | Weiss | B60W 30/0953 |

FOREIGN PATENT DOCUMENTS

| | | |
|---|---|---|
| DE | 102012203228 A1 | 9/2013 |
| DE | 102013205877 A1 | 10/2014 |
| DE | 102016013601 A1 | 6/2017 |
| DE | 102019201590 A1 | 8/2020 |
| JP | 2010132030 A * | 6/2010 |
| JP | 2018083551 A * | 5/2018 |
| WO | WO-2020089270 A1 * | 5/2020 |

* cited by examiner

METHOD AND APPARATUS FOR CONTROLLING A SAFETY DEVICE OF A VEHICLE, AND SAFETY SYSTEM FOR A VEHICLE

CROSS REFERENCE

The present application claims the benefit under 35 U.S.C. § 119 of German Patent Application No. DE 102020214029.4 filed on Nov. 9, 2020, which is expressly incorporated herein by reference in its entirety.

FIELD

The present invention relates to an apparatus and a method for controlling a safety device of a vehicle. A further subject of the present invention is a computer program.

BACKGROUND INFORMATION

Driver assistance systems that can perform automatic emergency braking of a vehicle as an intervention in the case of an acute risk of collision with one or several other traffic participants are, for example, conventional. In such an intervention a displacement of an impingement point, to be expected without the intervention, of another traffic participant on the vehicle into an undesired region of the vehicle can occur in some circumstances.

SUMMARY

The present invention provides a method, also an apparatus that uses that method, and a corresponding computer program, for controlling a safety device of a vehicle. The features disclosed herein make possible advantageous refinements of and improvements to the apparatus disclosed herein.

A collision in an intersection scenario, for example, can be prevented by a front cross traffic assistance function in combination with an autonomous emergency braking function (FCTA-AEB function). If such a collision cannot be completely prevented, but the collision or the impingement point would instead merely be displaced into another region of the host vehicle, an estimate of a displacement of the impingement point can be made. Such an estimate of the displacement of the impingement point, and a potential suppression or modification of an emergency braking operation, can be used to prevent damage in particular to a passenger compartment of the host vehicle, and thus to improve a safety status of occupants of the host vehicle. In accordance with embodiments, an execution of such an estimate of the displacement of the impingement point, and of a possible suppression or modification of an emergency braking operation, can in particular be made dependent on a collision-related velocity change of the vehicle, for example based on a mass and velocity of the target vehicle, and on an occupancy of seats in the host vehicle.

It is thereby possible in particular to prevent a situation in which a suppression of the emergency braking operation would occur if a disadvantageous displacement of the impingement point were estimated even though the safety of the occupants of the host vehicle is ensured. For example, if an intersecting target vehicle or external vehicle, constituting a collision object, is a bicycle, the damage caused to the host vehicle can be negligible and occupant safety is therefore ensured. A usefulness derived from the FCTA-AEB function can thus be enhanced by deciding against a suppression of the emergency braking operation. In other words, the usefulness of the FCTA-AEB function can be enhanced if the estimate of the impingement point is performed only when the safety of the occupants of the host vehicle would be endangered. The safety of the occupants of the host vehicle is endangered in particular when, for example, a momentum of the collision, depending on the mass and velocity of the target vehicle, and thus a velocity change of the host vehicle, is high, and/or if the seats of the host vehicle on the collision side are occupied.

Advantageously, according to example embodiments of the present invention, an enhancement of the usefulness of a cross-traffic assistance function with impingement point estimation can in particular be achieved. For example, if the estimate of the impingement point is performed only when it is advantageous for the safety of the occupants of the host vehicle, rather than in all cases of a predicted collision, the usefulness of the FCTA-AEB function with estimation of the impingement point can be enhanced. In addition, a computation outlay can be decreased if, in particular, the impingement point and the displacement of the impingement point because of a possible suppression or modification of the emergency braking operation are calculated only if a displacement of the impingement point can be advantageous for the safety of the occupants of the host vehicle.

The present invention provides a method for controlling a safety device of a vehicle, the safety device being embodied to react to an imminent collision of the vehicle with a collision object by way of an intervention in a longitudinal and/or lateral guidance of the vehicle. In accordance with an example embodiment of the present invention, the method includes the following steps:

reading in, from an interface to at least one environment sensor of the vehicle, environment data regarding a position, a velocity, and/or an acceleration of the collision object in an environment of the vehicle; from an interface to at least one trip data sensor of the vehicle, trip data regarding a position, a velocity and/or an acceleration of the vehicle; and from an interface to at least one seat occupancy sensor, seat occupancy data regarding an occupancy state of at least one seat of the vehicle by occupants;

ascertaining: an expected impingement side of the collision object on the vehicle, using the environment data and the trip data; a velocity change of the vehicle in the context of the collision, using the environment data and the trip data; and a seat occupancy distribution in the vehicle, using the seat occupancy data;

executing an evaluation of the velocity change with regard to a threshold value and/or of the seat occupancy distribution relative to the expected impingement; and generating, depending on a result of the evaluation, a control signal for output to an interface to the safety device, the control signal having at least one control parameter for controlling the safety device.

This method can be implemented, for example, in software or hardware or in a mixed form of software and hardware, for example in a control device or an apparatus. The vehicle can be a motor vehicle, in particular a passenger car or the like. The safety device can be embodied to bring about an autonomous emergency braking operation and, additionally or alternatively, an autonomous evasive maneuver of the vehicle. The collision object can be an external vehicle or a stationary object or obstacle. The environment data can be data detected relative to the vehicle. The at least one environment sensor can encompass, for example, a camera, a radar device and, additionally or alternatively, a lidar sensor of the vehicle. The at least one control parameter can represent a duration and/or an amplitude of an activation of a braking system, a steering system, a transmission and, additionally or alternatively, an engine of the vehicle. A seat occupancy sensor can be associated with each seat of the vehicle. A seat occupancy sensor can be embodied, for example, as a sensor sensitive to mechanical stress. The occupancy state can represent an occupied state of a seat or an unoccupied state of a seat. The velocity change can represent an estimated velocity change of the vehicle as a result of the collision. The seat occupancy distribution can encompass a datum regarding occupancy states of all seats of the vehicle. The seat occupancy distribution can represent the occupancy states of the seats with reference to their position in the vehicle.

In accordance with an example embodiment of the present invention, depending on the result of the evaluation, in accordance with an embodiment in the ascertaining step a first expected impingement point of the collision object on the vehicle can be ascertained using the expected impingement side, the environment data, and the trip data. In the executing step, an evaluation of the velocity change with regard to the threshold value and/or the seat occupancy distribution relative to the first expected impingement point can be executed.

In accordance with an example embodiment of the present invention, depending on the result of the evaluation, in accordance with an embodiment in the reading-in step intervention data regarding a planned intervention of the safety device can be read in from an interface to the safety device. The intervention data can represent a datum regarding a planned duration and, additionally or alternatively, a planned amplitude of an activation of a braking system, a steering system, a transmission and, additionally or alternatively, an engine of the vehicle. In the ascertaining step, a second expected impingement point of the collision object on the vehicle can additionally be ascertained using the environment data, the trip data, and the intervention data. The second expected impingement point can represent an impingement point with consideration of the planned intervention. In addition, in the executing step a location of the first expected impingement point and of a location of the second expected impingement point relative to subregions referred to the vehicle can be ascertained using reference data that define, for each subregion, an evaluation factor that depends on an effect of the location of an expected impingement point in the subregion on a safety status of at least one occupant of the vehicle. Each evaluation factor can be predefined on the basis of measurements, experiments and, additionally or alternatively, statistical methods. Each evaluation factor can represent an expected injury severity for occupants in the context of a location of an impingement point in the pertinent subregion. A subregion can encompass a sub-portion of the vehicle and, additionally or alternatively, a region, adjacent to a sub-portion of the vehicle, of an environment of the vehicle.

Such an example embodiment may offer the advantage that in the context of an imminent collision of a vehicle with a collision object, an impingement point and a possible displacement of the impingement point with consideration of an intervention of a safety device or of an assistance function of the vehicle can be determined, and can be used to control the safety device. For example, the impingement point and possible displacement of the impingement point can be predicted for consideration in the context of activation of an autonomous emergency braking (AEB) system for side impact scenarios or the like. In other words, a collision point of a collision object on the host vehicle can, in particular, be determined or predicted as a basis for an activation decision of a safety device, in particular an autonomous safety device. For this, for example, a detection of the expected collision point can be carried out and an ascertainment can be made as to whether and how that collision point will be displaced to a favorable or unfavorable position by a planned intervention of the safety device, in particular by adapting a velocity or trajectory of the host vehicle in the event of an autonomous braking or acceleration operation, or in the case of an autonomous evasive maneuver.

Depending on a nature of the planned intervention or activated reaction pattern, for example a length and an intensity of an autonomous braking intervention or evasive maneuver, the collision can thus be avoided or the impingement point can be displaced along a contour of the host vehicle, for example, in the case of a reduction in the velocity of the host vehicle because of a time gain that results in a later arrival in a collision zone. In particular, an accident attenuation can be achieved by a reduction in the velocity of the host vehicle, in which context a collision point can be displaced, by the intervention of the safety device, for example, from a rear side region to a front side region or to a central front region of the host vehicle. A worsening of an accident sequence due to an intervention by the safety device can, in particular, also be avoided, by the fact that in the context of an expected displacement of the collision point into the region of the passenger compartment of the host vehicle, the planned intervention can be prevented even if a reduction in the velocity of the host vehicle thereby fails to occur. For example, in particular, a direct impact onto the passenger compartment of the vehicle, with possibly more-serious injuries to the occupants, can be reliably prevented. In particular, an advantageous modification of the collision region on the vehicle, and if applicable of the entire collision event, can be made possible by displacing the impingement point by suitable application of control to the safety device.

In accordance with an example embodiment of the present invention, reference data that define, for at least one subregion in the region of a passenger compartment of the vehicle, a first evaluation factor that represents an effect having a first damage potential, and define, for at least one subregion outside a region of the passenger compartment, a second evaluation factor that represents an effect having a second damage potential, can be used in the executing step. The first damage potential can be greater than the second damage potential. A damage potential can be occupant-related and, additionally or alternatively, vehicle-structure-related. An embodiment of this kind offers the advantage that a decision regarding activation or deactivation of the intervention of the safety device can be made in simple, reliable, and exact fashion.

In accordance with an example embodiment of the present invention, reference data whose evaluation factors depend on a collision-related deformation of a sub-portion of the vehicle in at least one of the subregions can also be used in the executing step. The deformation can be defined as a vehicle deformation index (VDI, in particular VDI3). An embodiment of this kind offers the advantage of making possible a reliable statement as to which impingement point location is to be assumed to be less harmful for occupants.

In accordance with an example embodiment of the present invention, in the generating step, the control signal can furthermore be generated with at least one control parameter that brings about an enabling or a suppression of the planned intervention of the safety device. For example, an enabling of the planned intervention can be brought about if the location of the second expected impingement point is in a subregion whose evaluation factor is more favorable for safety than a further evaluation factor of a further subregion having the location of the first expected impingement point. For example, a suppression of the planned intervention can be brought about if the location of the first expected impingement point is in a subregion whose evaluation factor is more favorable for safety than a further evaluation factor of a further subregion having the location of the second expected impingement point. An advantageous displacement of the impingement point into a subregion that is less objectionable for safety can thereby be made possible by enabling or suppressing the planned intervention.

Additionally or alternatively, in the generating step the control signal can be generated with at least one control parameter that brings about a modification of the planned intervention of the safety device. A modified intervention of the safety device can be brought about in this context. The control signal can be generated using a result of an evaluation in which a location of a third expected impingement point that results in the context of the modified intervention is evaluated. An embodiment of this kind offers the advantage that the location of an expected impingement point can be optimized even when the first expected impingement point and the second expected impingement point happen to be unfavorably located.

In addition, in the generating step the control signal can be generated with at least one control parameter that brings about control of a duration and, additionally or alternatively, of an amplitude of the planned intervention. An embodiment of this kind offers the advantage that the safety device can be controlled in simple, reliable, and accurate fashion.

The present invention also provides an apparatus that is embodied to carry out, control, or implement, in corresponding devices, the steps of a variant of a method in accordance with the present invention. The object on which the present invention is based can also be quickly and efficiently achieved by this variant embodiment of the present invention in the form of an apparatus.

For this, the apparatus can have at least one computation unit for processing signals or data, at least one storage unit for storing signals or data, at least one interface to a sensor or an actuator for reading in sensor signals from the sensor or for outputting data signals or control signals to the actuator, and/or at least one communication interface for reading in or outputting data that are embedded in a communication protocol. The computation unit can be, for example, a signal processor, a microcontroller, or the like; the memory unit can be a flash memory, an EEPROM, or a magnetic storage unit. The communication interface can be embodied to read in or output data wirelessly and/or in wire-based fashion; a communication interface that can read in or output wire-based data can, for example, electrically or optically read in those data from a corresponding data transfer line or output them into a corresponding data transfer line.

An "apparatus" can be understood in the present case as an electrical device that processes sensor signals and, depending thereon, outputs control signals and/or data signals. The apparatus can have an interface that can be embodied in hardware- and/or software-based fashion. With a hardware-based embodiment the interfaces can be, for example, part of a so-called "system ASIC" that contains a wide variety of functions of the apparatus. It is also possible, however, for the interfaces to be independent integrated circuits or to be made up at least in part of discrete components. With a software-based embodiment, the interfaces can be software modules that are present, for example, on a microcontroller alongside other software modules.

In an advantageous embodiment of the present invention, the apparatus controls a safety device of the vehicle for occupant protection. The apparatus can access for that purpose, for example, sensor signals or sensor data such as environment data, trip data, and intervention data. Control is applied using the control signal by way of the safety device via actuators that are associated with a braking system, a steering system, a transmission and, additionally or alternatively, an engine of the vehicle.

In accordance with an example embodiment of the present invention, a safety system for a vehicle is also provided, the safety system having the following features: an embodiment of the apparatus described above; and the safety device, the safety device and the apparatus being signal-transferringly connected to one another.

In the context of the safety system, an embodiment of the apparatus described above can advantageously be used or utilized to control the safety device, in particular in the context of a recognized imminent collision. The vehicle in which the safety system is installed can also be referred to as a "host vehicle." An external vehicle constituting a collision object can also be referred to as a "target vehicle."

Also advantageous is a computer program product or computer program having program code that can be stored on a machine-readable medium or storage medium such as a semiconductor memory, a hard-drive memory, or an optical memory, and can be used to carry out, implement, and/or control the steps of the method in accordance with one of the embodiments described above, in particular when the program product or program is executed on a computer or an apparatus.

Exemplifying embodiments of the present invention are explained in further detail in the description below and are depicted in the figures.

DETAILED DESCRIPTION OF EXAMPLE EMBODIMENTS

Figure 1:
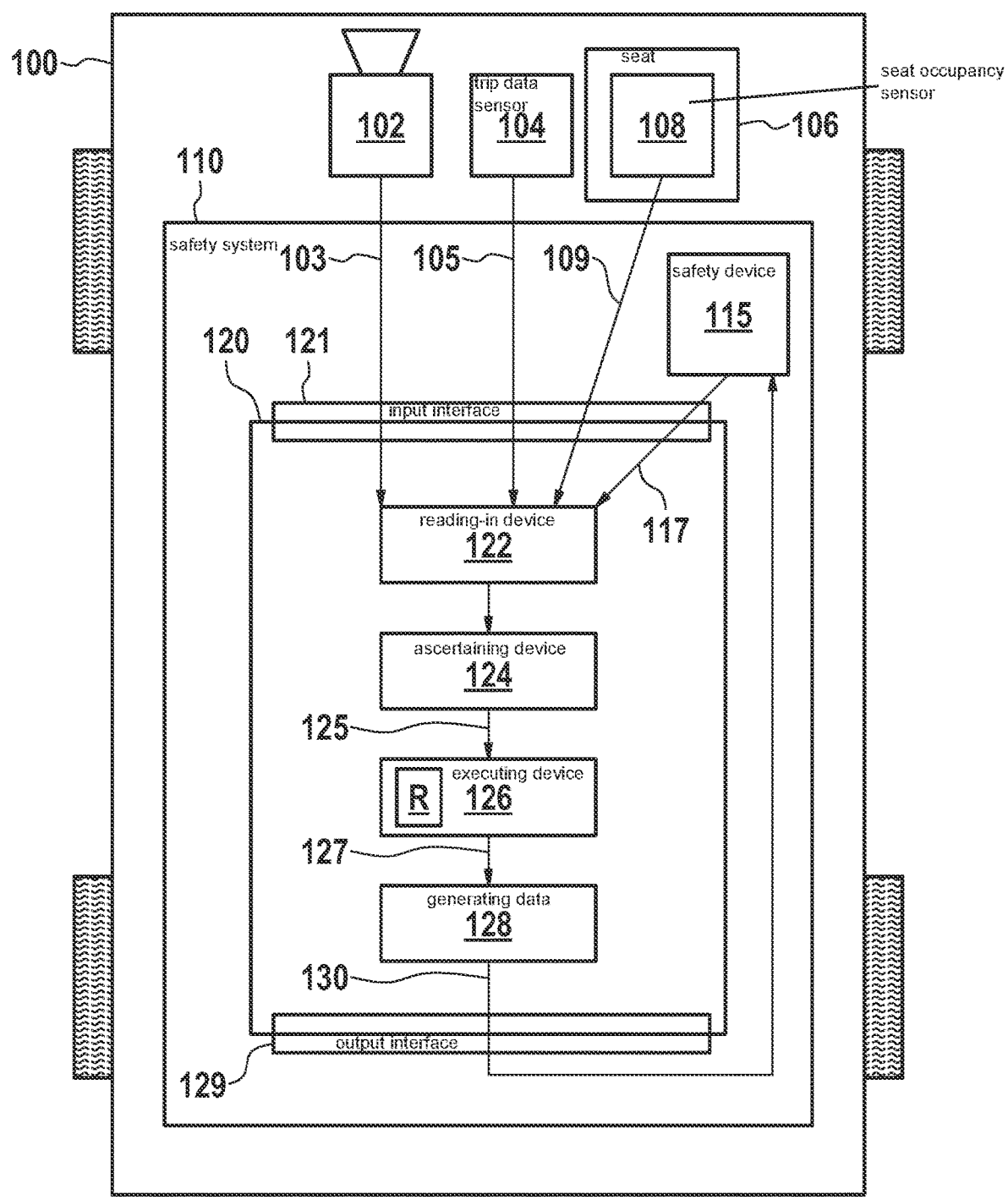
FIG. 1 schematically depicts a vehicle having a safety system, in accordance with an exemplifying embodiment of the present invention.

Before exemplifying embodiments of the present invention are described below in more detail, the background and principles of exemplifying embodiments will first be briefly discussed.

In active safety systems such as the safety system presented here, information from environment sensors, for instance radar or video, and an inherent motion, can be used to draw conclusions as to the criticality of a traffic situation. Because of viewing angle limitations of available systems for active safety, which are often equipped with front sensors having a limited viewing angle, the focus is, for example, on accidents involving traffic moving in longitudinally or slowly from the side. In such accidents, an opposing traffic participant collides primarily with a front region of the host vehicle, regardless of whether the system does or does not activate. Systems that use additional sensors, or sensors having no relevant limitations on the viewing angle, for instance corner radar sensors, can also react to traffic moving in rapidly from the side. Such application instances in the context of cross traffic are characterized in that collisions happen more frequently in the side region of the host vehicle.

A front cross traffic assist (FCTA) function can encompass, for example, the following reaction pattern:

Visual information that informs a driver of approaching cross traffic if the host vehicle is, for example, stationary at an intersection with poor visibility because of a viewing impediment.

Preventing initial movement, if a collision is imminent due to initial movement and driving into the travel path of the cross traffic.

Activation of suspension stiffening, increased brake-system pressure to move the brake pads against the brake disc, so-called "prefill."

Optionally: braking assistance triggered by the driver which generates additional brake pressure if necessary as emergency braking assistance.

Autonomous emergency braking, partial or complete, in the case of a detected imminent collision with cross traffic.

Optionally: activation of passive safety systems, for instance airbags, if a collision was unavoidable; activation of autonomous emergency steering (AES) to optimize a collision orientation.

In the description below of useful exemplifying embodiments of the present invention, identical or similar reference characters are used for elements that are depicted in the various Figures and function similarly, repeated description of those elements being omitted.

FIG. 1 schematically depicts a vehicle 100 having a safety system 110, in accordance with an exemplifying embodiment. Vehicle 100 is a motor vehicle, for example a passenger car. All that is shown of vehicle 100 in the depiction of FIG. 1 by way of example is an environment sensor 102, a trip data sensor 104, a seat 106, a seat occupancy sensor 108, and safety system 110. Safety system 110 is embodied to execute or bring about an autonomous emergency braking operation and/or an autonomous evasive maneuver of vehicle 100 in the event of an imminent collision of vehicle 100 with a collision object.

Environment sensor 102 is embodied to detect an environment of vehicle 100. More precisely, environment sensor 102 is embodied to detect a position, a velocity, a mass, and/or an acceleration of the collision object in the environment of vehicle 100. A determination or estimate of the mass of the collision object can be made. Environment sensor 102 is further embodied to furnish environment data 103 that represent the detected and/or determined or estimated position, velocity, mass, and/or acceleration of the collision object.

Trip data sensor 104 is embodied to detect trip data 105 of vehicle 100. More precisely, trip data sensor 104 is embodied to detect, as trip data 105, a position, a velocity, and/or an acceleration of vehicle 100. Trip data sensor 104 is furthermore embodied to furnish trip data 105.

Seat occupancy sensor 108 is associated with seat 106 of vehicle 100. An individual seat occupancy sensor 108 can be associated with each seat 106 of vehicle 100. Seat occupancy sensor 108 is embodied to detect an occupancy state of seat 106 by an occupant. Seat occupancy sensor 108 is furthermore embodied to furnish seat occupancy data 109 that represent the detected occupancy state.

Safety system 110 encompasses a safety device 115 and an apparatus 120 for controlling safety device 115. Safety device 115 and apparatus 120 are signal-transferringly connected to one another. Safety system 110, more precisely apparatus 120, is signal-transferringly connected to environment sensor 102 and to trip data sensor 104. Safety device 115 is embodied to react, by way of an intervention in a longitudinal and/or transverse guidance of vehicle 100, to an imminent collision of vehicle 100 with a collision object. Safety device 115 is also embodied to furnish intervention data 117 regarding a planned intervention of safety device 115. Apparatus 120 can also be referred to as a "control apparatus" or "control device." Safety system 110, more precisely apparatus 120, is signal-transferringly connected to environment sensor 102, to trip data sensor 104, and to seat occupancy sensor 108. Apparatus 120 encompasses an input interface 121, a reading-in device 122, an ascertaining device 124, an executing device 126, a generating device 128, and an output interface 129.

Reading-in device 122 is embodied to read in environment data 103, trip data 105, and seat occupancy data 109 from input interface 121. Apparatus 120 is signal-transferringly connected via input interface 121 to environment sensor 102, to trip data sensor 104, and to seat occupancy sensor 108. Reading-in device 122 is also embodied to forward the read-in data to ascertaining device 124.

Ascertaining device 124 is embodied to ascertain, using environment data 103 and trip data 105, an expected impingement side of the collision object on vehicle 100. Ascertaining device 124 is further embodied to ascertain, using environment data 103 and trip data 105, a velocity change of vehicle 100 in the context of the collision, and to ascertain a seat occupancy distribution in vehicle 100 using seat occupancy data 109. Ascertaining device 124 is also embodied to forward ascertained data 125, which represent the ascertained expected impingement side, the ascertained velocity change, and the ascertained seat occupancy distribution, to executing device 126.

Executing device 126 is embodied to receive ascertained data 125 from ascertaining device 124. Executing device 126 is also embodied to execute an evaluation of ascertained data 125.

Executing device 126 is embodied to execute an evaluation of the velocity change with respect to a predefined threshold value for the velocity change, and/or an evaluation of the seat occupancy distribution relative to the expected impingement side. Executing device 126 is also embodied to forward result data 127, which represent a result of the evaluation, to generating device 128.

Generating device 128 is embodied to generate, depending on the result of the evaluation represented by result data 127, a control signal 130 for output to output interface 129 to safety device 115. Control signal 130 encompasses at least one control parameter for controlling safety device 115. Apparatus 120 is embodied to output control signal 130 to output interface 129 to safety device 115.

In accordance with an exemplifying embodiment, apparatus 120 is embodied to execute, depending on the result, represented by result data 127, of the evaluation executed by way of executing device 126, an additional processing pass or an additional execution loop. An exemplifying execution pattern relevant to this is explained in further detail in FIG. 3. Ascertaining device 124 is embodied to ascertain a first expected impingement point of the collision object on vehicle 100, using the expected impingement side, environment data 103, and trip data 105. Executing device 126 is embodied to execute an evaluation of the velocity change with respect to the threshold value and/or the seat occupancy distribution relative to the first expected impingement point. Reading-in device 122 is furthermore optionally embodied to read in intervention data 117 from input interface 121 to safety device 115. Ascertaining device 124 is furthermore embodied to ascertain a second expected impingement point of the collision object of vehicle 100 using environment data 103, trip data 105, and intervention data 117. Ascertained data 125 also represent the ascertained second expected impingement point. Executing device 126 is furthermore embodied to execute, using reference data R, an evaluation of a location of the first expected impingement point and of a location of the second expected impingement point relative to subregions referred to vehicle 100. Reference data R define, for each subregion, an evaluation factor that depends on an effect of the location of an expected impingement point in the subregion on a safety status of at least one occupant of vehicle 100. Result data 127 also represent the result of this evaluation.

In accordance with an exemplifying embodiment, executing device 126 is embodied to use reference data R, which define for at least one subregion in the region of a passenger compartment of vehicle 100 a first evaluation factor that represents an effect having a first damage potential, and define for at least one subregion outside a region of the passenger compartment a second evaluation factor that represents an effect having a second damage potential. The first damage potential is greater than the second damage potential. In particular, executing device 126 is embodied to use reference data R whose evaluation factors depend on a collision-related deformation of a sub-portion of vehicle 100 in at least one of the subregions.

In accordance with an exemplifying embodiment, generating device 128 is embodied to generate control signal 130 with at least one control parameter that brings about an enabling or a suppression of the planned intervention of safety device 115. Additionally or alternatively, generating device 128 is embodied to generate control signal 130 with at least one control parameter that brings about a modification of the planned intervention of safety device 115. In particular, generating device 128 is embodied to generate control signal 130 with at least one control parameter that brings about control of a duration and/or an amplitude of the planned intervention.

Figure 2:
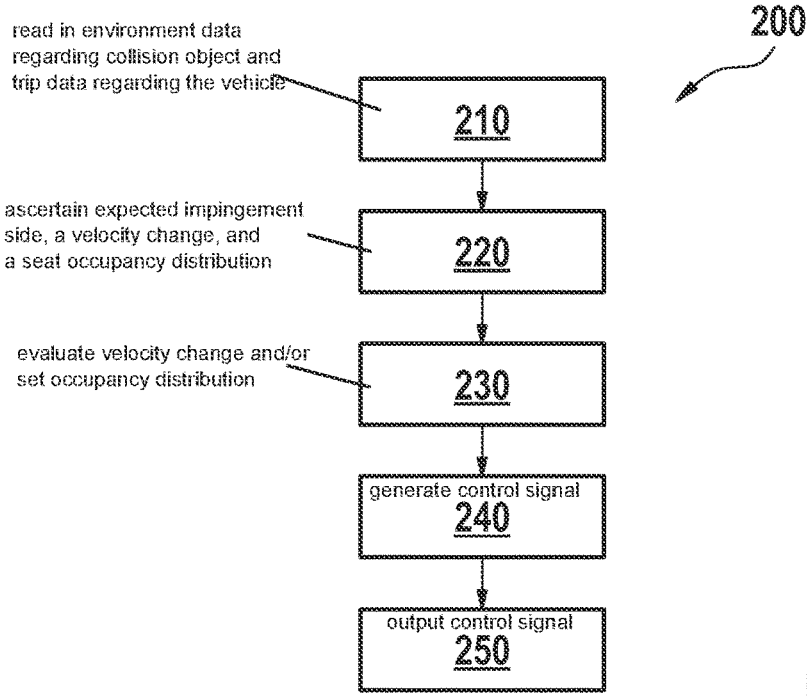
FIG. 2 is a flow chart for a control method, in accordance with an exemplifying embodiment of the present invention.

FIG. 2 is a flow chart of a control method 200, in accordance with an exemplifying embodiment. Control method 200 is executable in order to control a safety device of a vehicle. Control method 200 is executable in order to control the safety device of FIG. 1 or a similar safety device. Control method 200 is also executable using the apparatus of FIG. 1 or a similar apparatus. Control method 200 encompasses a reading-in step 210, an ascertaining step 220, an executing step 230, and a generating step 240. An outputting step 250 is additionally shown.

In reading-in step 210, environment data regarding a position, a velocity, a mass, and/or an acceleration of the collision object in an environment of the vehicle are read in from an interface to at least one environment sensor of the vehicle. In addition, in reading-in step 210 trip data regarding a position, a velocity, and/or an acceleration of the vehicle are read in from an interface to at least one trip data sensor of the vehicle.

In reading-in step 210, seat occupancy data regarding an occupancy state of at least one seat of the vehicle by occupants are also read in from an interface to at least one seat occupancy sensor of the vehicle.

In ascertaining step 220, an expected impingement side of the collision object on the vehicle is then ascertained using the environment data and the trip data. A velocity change of the vehicle in the context of the collision is also ascertained in ascertaining step 220 using the environment data and the trip data, and a seat occupancy distribution in the vehicle is ascertained using the seat occupancy data. An evaluation of the velocity change with respect to a threshold value and/or of the seat occupancy distribution relative to the expected impingement side is then in turn executed in executing step 230. In generating step 240, a control signal for output to an interface to the safety device is then generated depending on a result of the evaluation executed in executing step 230. The control signal encompasses at least one control parameter for controlling the safety device.

Depending on the result of the evaluation executed in executing step 230, in accordance with an exemplifying embodiment control method 200 is additionally executed as follows: in ascertaining step 220, a first expected impingement point of the collision object on the vehicle is ascertained using the expected impingement side, the environment data, and the trip data; and in executing step 230, an evaluation of the velocity change in terms of the threshold value and/or of the seat occupancy distribution relative to the first expected impingement point is executed. In addition, optionally in reading-in step 210, intervention data regarding a planned intervention of the safety device are read in from an interface to the safety device. In ascertaining step 220, a second expected impingement point of the collision object on the vehicle is ascertained using the environment data, the trip data, and the intervention data. In executing step 230, a location of the first expected impingement point and of a location of the second expected point relative to subregions referred to the vehicle are ascertained using reference data that define, for each subregion, an evaluation factor that depends on an effect of the location of an expected impingement point in the subregion on a safety status of at least one occupant of the vehicle. According to this exemplifying embodiment, control method 200 is performed if the velocity change is above the threshold value and/or if the seat occupancy distribution shows, relative to the expected impingement side and/or the first expected impingement point, occupied seats on the impingement side or on the impingement-point side.

In accordance with an exemplifying embodiment, control method 200 also encompasses outputting step 250. In outputting step 250, the control signal generated in generating step 240 is outputted to the interface to the safety device.

Figure 3:
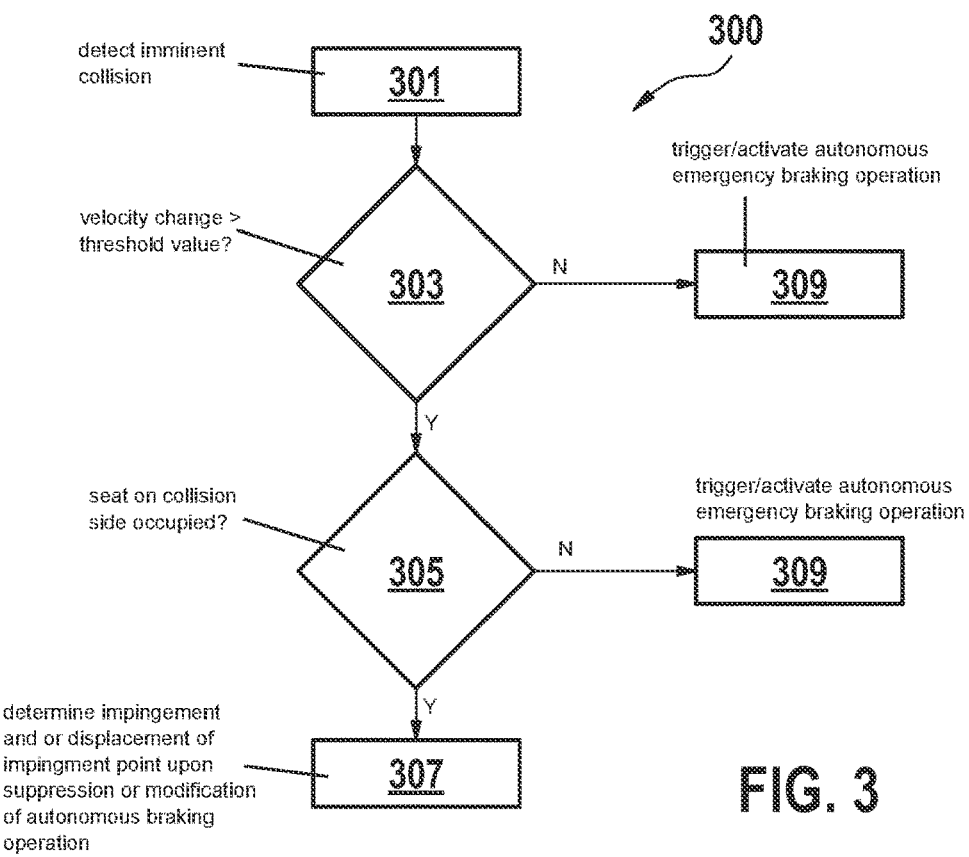
FIG. 3 is a flow chart of a control process, in accordance with an exemplifying embodiment of the present invention.

FIG. 3 is a flow chart of a control process 300 in accordance with an exemplifying embodiment. Control process 300 is executable in conjunction with the apparatus of FIG. 1 or a similar apparatus, and/or with the method of FIG. 2 or a similar method.

In a block 301, an imminent collision of the vehicle with the collision object is detected. From block 301, control process 300 transitions to a decision block 303 that determines whether the velocity change (dv) is greater than a threshold value (dv_threshold), i.e. whether the condition dv>dv_threshold is satisfied. If the condition is not satisfied, control process 300 transitions to a block 309 in which an autonomous emergency braking operation can be activated or triggered using the safety device. If the condition is satisfied, control process 300 transitions to a further decision block 305 that determines whether at least one seat of the vehicle on the collision side is occupied. If not, control process 300 transitions to block 309. If so, control process 300 transitions to a block 307, in which a determination or estimate of the impingement point, and of the displacement of the impingement point upon suppression or modification of the autonomous braking operation, is performed.

If the velocity change as a result of the impact in accordance with the momentum principle is small, for example if the mass of the target vehicle is small and/or the velocity of the target vehicle is low, the impact is less severe and the safety of the occupants of the host vehicle is ensured. This is checked in decision block 303 based on the velocity change. The emergency braking operation can consequently be executed, as shown in block 309. Execution of the emergency braking operation is advantageous because the emergency braking operation decelerates the host vehicle and the collision is therefore even less intense. Even if the target vehicle were to impinge upon the passenger compartment of the host vehicle, the momentum of the impact can be so low that occupant safety is ensured.

It is also sensible to check whether the seats of the host vehicle on the collision side are occupied; this occurs in further decision block 305. If there are no occupants sitting on the side of the predicted collision, it is immaterial whether the target vehicle impinges on the passenger compartment or anywhere else on the side of the host vehicle, since no occupants who might be injured are sitting there. The emergency braking operation can therefore be executed. Execution of the emergency braking operation is more advantageous, since the emergency braking operation decelerates the host vehicle and the collision is therefore less intense.

Thanks to the checking of the momentum and of the occupancy of the seats of the host vehicle, there are more cases in which an emergency braking operation based on the FCTA-AEB function is executed, and the usefulness of the FCTA-AEB with estimation of the impingement side and/or impingement point can be enhanced. In addition, there are fewer cases in which the estimate of the impingement side and/or impingement point needs to be calculated, and computation outlay can therefore be reduced. The manner in which the usefulness of the FCTA-AEB function with estimation of the impingement side and/or impingement point can be enhanced can be described in particular with reference to the flow chart for control process 300. If a collision is detected (cf. block 301), a check of the velocity change due to the collision (momentum principle) is made (cf. decision block 303). If the momentum or velocity change is no greater than a specified threshold, the emergency braking operation can be executed (cf. block 309). If the momentum or velocity change is greater than that threshold, a check of the occupancy of the seats of the host vehicle is made (cf. further decision block 305). If the seats on the side of the predicted collision are not occupied, the emergency braking operation can be executed (cf. block 309). If the seats on the side of the predicted collision are occupied, an estimate of the impingement point can be made (cf. block 307) and, depending on the result thereof, an emergency braking operation can be either executed or suppressed.

If an exemplifying embodiment encompasses an "and/or" relationship between a first feature and a second feature, this is to be read to mean that the exemplifying embodiment according to one embodiment has both the first feature and the second feature, and according to a further embodiment has either only the first feature or only the second feature.

What is claimed is:

1. A method for controlling a safety device of a vehicle, the safety device being configured to react to an imminent collision of the vehicle with a collision object by way of an intervention in a longitudinal and/or lateral guidance of the vehicle, the method comprising the following steps:
    reading in: (i) from an interface to at least one environment sensor of the vehicle, environment data regarding a position of the collision object, and/or a velocity of the collision object, and/or a mass of the collision object, and/or an acceleration of the collision object, in an environment of the vehicle, (ii) from an interface to at least one trip data sensor of the vehicle, trip data regarding a position of the vehicle, and/or a velocity of the vehicle, and/or an acceleration of the vehicle, and (iii) from an interface to at least one seat occupancy sensor of the vehicle, seat occupancy data regarding an occupancy state of at least one seat of the vehicle by occupants;
    ascertaining: (i) an expected impingement side of the collision object on the vehicle, using the environment data and the trip data, (ii) a velocity change of the vehicle that will occur due to the collision, using the environment data and the trip data; and (iii) a seat occupancy distribution in the vehicle, using the seat occupancy data;
    executing an algorithm that defines an evaluation of the velocity change with regard to a threshold value and of the seat occupancy distribution relative to the expected impingement; and
    generating, depending on a result of the evaluation, a control signal for output to an interface to the safety device, the control signal having at least one control parameter for controlling the safety device.

2. The method as recited in claim 1, wherein in the ascertaining step, a first expected impingement point of the collision object on the vehicle is ascertained using the expected impingement side, the environment data, and the trip data, and in the executing step, an evaluation of the velocity change with regard to the threshold value and/or the seat occupancy distribution relative to the first expected impingement point is executed.

3. The method as recited in claim 2, wherein depending on the result of the evaluation, in the reading-in step, intervention data regarding a planned intervention of the safety device are read in from an interface to the safety device, in the ascertaining step, a second expected impingement point of the collision object on the vehicle is ascertained using the environment data, the trip data, and the intervention data, and in the executing step, a location of the first expected impingement point and of a location of the second expected impingement point relative to subregions referred to the vehicle are ascertained using reference data that define, for each subregion of the subregions, an evaluation factor that depends on an effect of a location of an expected impingement point in the subregion on a safety status of at least one occupant of the vehicle.

4. The method as recited in claim 3, wherein the reference data include first reference data that define, for at least one subregion in a region of a passenger compartment of the vehicle, a first evaluation factor that represents an effect having a first damage potential, and define, for at least one subregion outside a region of the passenger compartment, a second evaluation factor that represents an effect having a second damage potential, the first reference data being used in the executing step, the first damage potential being greater than the second damage potential.

5. The method as recited in claim 3, wherein the reference data include first reference data whose evaluation factors depend on a collision-related deformation of a sub-portion of the vehicle in at least one of the subregions, the first reference data being used in the executing step.

6. The method as recited in claim 1, wherein in the generating step, the control signal is generated with at least one control parameter that brings about an enabling or a suppression of the planned intervention of the safety device.

7. The method as recited in claim 1, wherein in the generating step, the control signal is generated with at least one control parameter that brings about a modification of the planned intervention of the safety device.

8. The method as recited in claim 1, wherein in the generating step, the control signal is generated with at least one control parameter that brings about control of a duration and/or of an amplitude of the planned intervention of the safety device.

9. An apparatus configured to control a safety device of a vehicle, the safety device being configured to react to an imminent collision of the vehicle with a collision object by way of an intervention in a longitudinal and/or lateral guidance of the vehicle, the apparatus configured to:
- read in: (i) from an interface to at least one environment sensor of the vehicle, environment data regarding a position of the collision object, and/or a velocity of the collision object, and/or a mass of the collision object, and/or an acceleration of the collision object, in an environment of the vehicle, (ii) from an interface to at least one trip data sensor of the vehicle, trip data regarding a position of the vehicle, and/or a velocity of the vehicle, and/or an acceleration of the vehicle, and (iii) from an interface to at least one seat occupancy sensor of the vehicle, seat occupancy data regarding an occupancy state of at least one seat of the vehicle by occupants;
- ascertain: (i) an expected impingement side of the collision object on the vehicle, using the environment data and the trip data, (ii) a velocity change of the vehicle that will occur due to the collision, using the environment data and the trip data; and (iii) a seat occupancy distribution in the vehicle, using the seat occupancy data;
- execute an algorithm that defines an evaluation of the velocity change with regard to a threshold value and of the seat occupancy distribution relative to the expected impingement; and
- generate, depending on a result of the evaluation, a control signal for output to an interface to the safety device, the control signal having at least one control parameter for controlling the safety device.

10. A safety system for a vehicle, the safety system comprising:
- a safety device; and
- an apparatus configured to control the safety device of a vehicle, the safety device being configured to react to an imminent collision of the vehicle with a collision object by way of an intervention in a longitudinal and/or lateral guidance of the vehicle;
- wherein:
  - the apparatus configured to:
    - read in: (i) from an interface to at least one environment sensor of the vehicle, environment data regarding a position of the collision object, and/or a velocity of the collision object, and/or a mass of the collision object, and/or an acceleration of the collision object, in an environment of the vehicle, (ii) from an interface to at least one trip data sensor of the vehicle, trip data regarding a position of the vehicle, and/or a velocity of the vehicle, and/or an acceleration of the vehicle, and (iii) from an interface to at least one seat occupancy sensor of the vehicle, seat occupancy data regarding an occupancy state of at least one seat of the vehicle by occupants,
    - ascertain: (i) an expected impingement side of the collision object on the vehicle, using the environment data and the trip data, (ii) a velocity change of the vehicle that will occur due to the collision, using the environment data and the trip data; and (iii) a seat occupancy distribution in the vehicle, using the seat occupancy data,
    - execute an algorithm that defines an evaluation of the velocity change with regard to a threshold value and of the seat occupancy distribution relative to the expected impingement, and
    - generate, depending on a result of the evaluation, a control signal for output to an interface to the safety device, the control signal having at least one control parameter for controlling the safety device; and
  - the safety device and the apparatus are signal-transferringly connected to one another.

11. A non-transitory machine-readable storage medium on which is stored a computer program for controlling a safety device of a vehicle, the safety device being configured to react to an imminent collision of the vehicle with a collision object by way of an intervention in a longitudinal and/or lateral guidance of the vehicle, the computer program, when executed by a computer, causing the computer to perform the following steps:
- reading in: (i) from an interface to at least one environment sensor of the vehicle, environment data regarding a position of the collision object, and/or a velocity of the collision object, and/or a mass of the collision object, and/or an acceleration of the collision object, in an environment of the vehicle, (ii) from an interface to at least one trip data sensor of the vehicle, trip data regarding a position of the vehicle, and/or a velocity of the vehicle, and/or an acceleration of the vehicle, and (iii) from an interface to at least one seat occupancy sensor of the vehicle, seat occupancy data regarding an occupancy state of at least one seat of the vehicle by occupants;
- ascertaining: (i) an expected impingement side of the collision object on the vehicle, using the environment data and the trip data, (ii) a velocity change of the vehicle that will occur due to the collision, using the environment data and the trip data; and (iii) a seat occupancy distribution in the vehicle, using the seat occupancy data;
- executing an algorithm that defines an evaluation of the velocity change with regard to a threshold value and of the seat occupancy distribution relative to the expected impingement; and
- generating, depending on a result of the evaluation, a control signal for output to an interface to the safety device, the control signal having at least one control parameter for controlling the safety device.

\* \* \* \* \*